Dec. 2, 1969  R. DIETRICH ET AL  3,481,658

SIGHTING TELESCOPES HAVING A LUMINOUS AIMING MARK

Filed July 1, 1966

Inventors
Rudolf Dietrich
Harry Zellner

United States Patent Office 3,481,658
Patented Dec. 2, 1969

3,481,658
SIGHTING TELESCOPES HAVING A
LUMINOUS AIMING MARK
Rudolf Dietrich and Harry Zollner, Jena, Germany, assignors to VEB Carl Zeiss Jena, Jena, District of Gera, Germany
Filed July 1, 1966, Ser. No. 564,494
Int. Cl. G02b 27/32, 5/14, 21/06
U.S. Cl. 350—10                                                    4 Claims

ABSTRACT OF THE DISCLOSURE

A sighting telescope has a diaphragm which lies in the common image plane of the objective and the eyepiece. A light-source is rigidly connected with a diaphragm and emits light only in the direction of the objective. A plane-parallel optical plate inclined relatively to the optical axis of the telescope is located on the object side of the objective. The objective images the light-source at infinity; the light is reflected by the plate; and the objective focuses the light to a light-source image in the objective image plane.

---

This invention relates to sighting telescopes of the kind having a luminous aiming mark in the focal plane of their objective, particularly for use on sporting guns for shooting in twilight.

Known sighting telescopes have a mechanical aiming mark located in the objective focal plane and laterally illuminable for twilight use. Lateral illumination involves irradiation harmful to the discernibility of the target. The shortcomings of such illumination do not appear in reflex sights. Sights of the latter kind have an illumination device and a convergent lens near the object side of the sighting telescope proper, the optical axis of this device and that of the telescope enclosing an angle. These sights are accordingly bulky and heavy. Moreover, the additional optical parts make it easy for the aiming mark to be thrown out of correct alignment. Another possibility of illuminating the aiming mark consists in locating this mark outside the telescope light beam and by means of semi-transparent mirrors or beam-splitting cubes producing an image of it in that beam. Apart from the necessary special coating on these optical elements, the beam-splitting cube in the convergent telescope beam presents optical difficulties due to astigmatism. A beam-splitting cube is a costly and heavy structural element with high demands on accuracy of manufarture. It is also known to place a fluorescent mark in a focal plane of the sighting telescope, but the inherent scintillation tendencies of such a mark are inimical to good aiming in twilight. A further known aiming mark is produced by a capillary light conduit of glass the free end face of which lies in the optical axis of the sighting telescope and is conjugated to the eyepiece. This self-luminous mark is however very sensitive to disalignment and improper handling.

The present invention aims at providing a small sighting telescope of light weight including a luminous aiming mark which is protected against disalignment and damage and produces no irradiation or any other adverse influence on the telescope field of view, and which is reflected into the beam of the sighting telescope without costly and heavy optical elements liable to produce errors.

To this end the present invention consists in a sighting telescope having a luminous aiming mark in the focal plane of its objective, characterized in that the objective focal plane contains an off-center light source radiating only towards the objective, and that near the object side of the objective a plane-parallel plate is located which is inclined relatively to the telescope optical axis and reflects at least part of the rays of the light source through the telescope objective to the center of the focal plane. The invention accordingly combines the advantages and excludes the disadvantages of the known telescope sights.

For adjustment, the transparent plane-parallel plate is advantageously so mounted that its inclination is variable. To avoid disturbing reflex images in the sighting telescope, the plate surface remote from the objective is coated with an anti-reflecting layer.

The light source may be primary or secondary. It is preferably the one end face of a light conduit the other end face of which lies near a primary light source. The stability of the position of the light conduit is of no consequence, provided that its two end faces remain in their respective positions.

In order that the invention may be more readily understood, reference is made to the accompanying drawings which illustrate diagrammatically and by way of example one embodiment thereof and in which.

Figure 1:
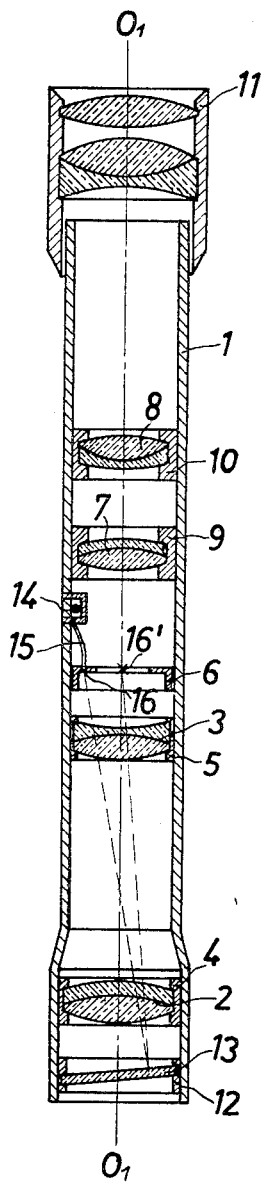
FIG. 1 shows a sighting telescope in longitudinal section.

With reference to FIG. 1 of the drawings, a telescope tube 1 contains a two-element objective 2, 3 in mounts 4, 5, a diaphragm 6 in the focal plane of the objective 2, 3 and a reversing system 7, 8 in mounts 9, 10. The optical axis of the telescope is $O_1$–$O_1$. A mounting ring 12 near the object side of the element 2 contains a plane-ends of the conduit 15 being respectively fastened to the axis $O_1$–$O_1$. An eyepiece 1 of the tube 1 is adjustable along the axis $O_1$–$O_1$. The tube 1 includes an illumination device 14, from where a light conduit 15, for example a bundle of glass fibers, leads to the diaphragm 6, the two ends of thec onduit 15 being respectively fastened to the illumination device 14 and the diaphragm 6. Electric connection of the illumination device 14 makes the conduit 15 transmit light to the focal plane of the objective 2, 3. The one end face of the conduit 15 produces a secondary light source 16 in that focal plane, and the objective 2, 3 tends to image the light source 16 at infinity. The rays from the light source 16 are however reflected by the plane-parallel plate 13 and redirected through the objective 2, 3 in such a manner that an image 16′ of the light source 16 is formed in the objective focal plane. The image 16′ is the aiming mark of the telescope.

Figure 2:
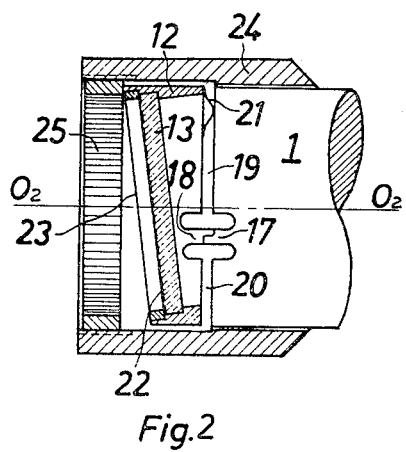
FIG. 2 shows the objective end of this telescope partly in longitudinal section.

Whereas in FIG. 1 the mounting ring 12 carrying the plane-parallel plate 13 is fastened to the telescope tube 1, the mounting ring 12 in FIG. 2 is linked to the tube 1 in such a manner as to be adjustable. The mounting ring 12 with the exception of two webs 17 and 18 is separated from the tube 1 by clearances 19 and 20. The webs 17 and 18 act as springs, their elasticity being increased by a spring plate 21. The object side of the plane-parallel plate 13 has an anti-reflecting coating 22. The plate 13 and the optical axis $O_2$—$O_2$ of the telescope encloses angles other than 90°. The plane of a light-entrance aperture 23 is likewise inclined to the optical axis $O_2$—$O_2$. Fastened to the tube 1 is an attachment 24 which encloses the mounting ring 12 and in the object-side end of which is screwed a milled ring 25. FIG. 2 shows the attachment 24, the ring 25, the mounting ring 12 and the plate 13 in section along the optical axis $O_2$—$O_2$. When screwing the ring 25 in the tube 24, the inclination of the plate 13 relative to the optical axis $O_2$—$O_2$ is varied in consequence of the resiliency which the webs 17, 18 and the spring 21 impart to the mounting ring 12.

Figure 3:
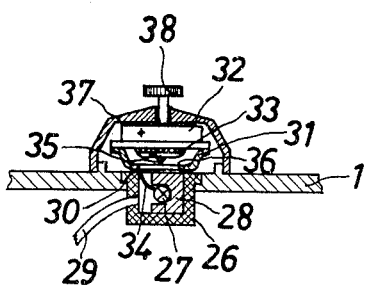
FIG. 3 is a sectional view of the illumination device.

In FIG. 3, the tube 1 of the sighting telescope contains a receptacle 26 for a lamp 27 and a lamp socket 28, the receptacle 26 being of insulating material. A light conduit 29 traverses the wall of the receptacle 26 in such a way that its end face is struck by light emanating from the lamp 27. The one side of a spring plate 31 urges against an open part 30 of the receptacle 26, and the other side of the spring plate 31 carries a pile 32, the poles of which are respectively marked + and − and are separated from each other by an insulating layer 33. The positive pole by means of the spring plate 31 and a wire 34 connects up to the lamp 27, and the negative pole by means of a contact 35 is connectable to the lamp socket 28, for which purpose the spring plate 31 has a perforation 36 above the socket 28. A cap 37 fastened to the telescope tube 1 covers the illumination device and is provided with a milled head 38 by means of which the contact 35 can be connected to the socket 28 against the action of the spring plate 31.

We claim:
1. A sighting telescope having a tube, said tube including
an objective,
an eyepiece,
said objective and said eyepiece having a common image plane,
a diaphragm located in said image plane,
a light-source secured outside the optical axis of the telescope to said diaphragm,
said light-source emitting light only in the direction of said objective,
said objective imaging said light-source at infinity,
said diaphragm and said light-source being located between said objective and said eyepiece,
and a plane-parallel optical plate disposed on the object side of said objective and inclined relatively to said optical axis,
said objective producing an image of said light-source at the center of said image plane,
said image being the sighting mark of the telescope.

2. A sighting telescope as claimed in claim 1, wherein said plate is mounted in a mounting ring,
said mounting ring is linked by resilient means to said tube,
said mounting ring includes a light-entrance aperture which is remote from said objective and inclined relatively to said optical axis,
an attachment is rigidly connected to said tube and envelops said mounting ring,
a milled setting ring screws into the object-side end of said attachment,
and said setting ring urges said mounting ring against said resilient means into said tube.

3. A sighting telescope as claimed in claim 2, wherein the side of said plate remote from said objective has an anti-reflecting layer.

4. A sighting telescope as claimed in claim 3, wherein said light-source is that end face of a light conduit which lies in said common image plane of said objective and said eyepiece.

References Cited

UNITED STATES PATENTS

| | | | |
|---|---|---|---|
| 1,931,552 | 10/1933 | Maris. | |
| 2,944,463 | 7/1960 | Rantsch | 350—91 X |
| 3,230,627 | 1/1966 | Rickert et al. | 350—10 X |
| 3,320,671 | 5/1967 | Rickert et al. | 350—10 X |

FOREIGN PATENTS 219,299   1/1962   Austria.

DAVID SCHONBERG, Primary Examiner

T. H. KUSMER, Assistant Examiner

U.S. Cl. X.R.
350—91, 96